United States Patent Office 3,467,736
Patented Sept. 16, 1969

3,467,736
ALLYLPHOSPHONODITHIOATES
Erik K. Regel, Mission, Kans., and Marion F. Botts, Independence, Mo., assignors to Chemagro Corporation, Kansas City, Mo., a corporation of New York
No Drawing. Filed Feb. 15, 1967, Ser. No. 616,203
Int. Cl. C07f 9/40, 9/42; A01n 9/36
U.S. Cl. 260—956    7 Claims

ABSTRACT OF THE DISCLOSURE

S,S-dialkyl allylphosphonodithioates are prepared by reacting allylphosphonyl dichloride with a 2 to 4 carbon atom alkyl mercaptan in the presence of a tertiary amine. The products are useful as saprophytic and parasitic nematocides.

---

The present invention relates to novel unsaturated phosphonodithioates which are useful as nematocides.

It has previously been proposed to kill nemotodes with S,S-dialkyl alkylphosphonodithioates in Wilson Patent 3,162,570. Wilson states that the alkyl group can contain 1 to 6 carbon atoms. In Example 4, the only example of nematocide treatment, Wilson shows treating parasitic nematodes (i.e. those causing root knots) with certain dialkyl methyl phosphonites and does not show treating saprophytic nematodes. Regel application Ser. No. 407,534, filed Oct. 29, 1964, shows the treatment of nematodes with S,S-dialkyl chloromethyl phosphonodithioates and S,S-dialkyl ethyl phosphonodithioate. In the parasitic nematocide tests the S,S-dialkyl chloromethyl phosphonodithioates showed 100% activity at 25 p.p.m. when the alkyl group had 1 to 4 carbon atoms. At 2 to 4 carbon atoms this activity continued to 12 p.p.m. and in some cases to lower concentrations. S,S-dimethyl ethyl phosphonodithioate showed 100% activity to 12 p.p.m. and S,S-diethyl ethyl phosphonodithioate showed 100% activity to 3 p.p.m. However, the activity against saprophytic nematodes was not as great. Thus with the exception of S,S,-dipropyl chloromethyl phosphonodithioate none of the compounds of the aforementioned Regel application were 100% effective at 200 p.p.m. and even this compound was only 30% effective at 25 p.p.m. In fact with the exception of this compound and S,S-diisobutyl chloromethyl phosphonodithioate none of the compounds of the type set forth above were effective as saprophytic nematocides at 25 p.p.m. S,S-dimethyl ethyl phosphonodithioate was 30% effective as a saprohytic nematocide at 200 p.p.m. and ineffective at 100 p.p.m. and lower dosages, while S,S-diethyl ethyl phosphonodithioate was 50% effective at 200 p.p.m., 30% effective at 100 p.p.m. and ineffective at 50 p.p.m. or lower dosages.

It is an object of the present invention to prepare novel allyl phosphonodithioates.

Another object is to develop an improved process for killing nematodes.

A further object is to develop a nematocide showing good activity against both parasitic and saprophytic nematodes.

Yet another object is to develop a nematocide which is noninjurious to plants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds of the formula

and employing them as nematocides. In the formula $R_1$ is allyl and $R_2$ and $R_3$ are alkyl of 2 to 4 carbon atoms. It is critical that these limitations be observed. Thus if $R_2$ and $R_3$ are methyl or are alkyl above 4 carbon atoms the nematocidal activity is greatly reduced. It also has been found that if $R_1$ is vinyl or aryl or carbethoxy that no significant nematocidal activity is obtained. On the other hand, the allyl phosphonodithioate compounds of the invention are effective in controlling both saprophytic and parasitic nematodes and have been found effective in controlling nematodes on both tomato seedlings and tobacco without injuring the plants.

Among the nematocides of the present invention there can be mentioned S,S-diethyl allylphosphonodithioate, S,S-dipropyl allylphosphonodithioate, S,S-dibutyl allylphosphonodithioate, S,S-diisopropyl allylphosphonodithioate, S,S-diisobutyl allylphosphonodithioate, S,S-di sec. butyl allylphosphonodithioate, S,S-di tert, butyl allylphosphonodithioate, S,S-ethyl propyl allylphosphonodithioate, S,S-propyl butyl allylphosphonodithioate.

The most effective nematocide tested was S,S-dipropyl allylphosphonodithioate for overall nematocidal activity and for activity against parasitic nematodes. S,S-dibutyl allylphosphonodithioate was slightly superior against saprophyitc nematodes but was not nearly as effective against parasitic nematodes. S,S,-diisopropyl allylphosphonodithioate was inferior to the normal isomer against both saprophytic and parasitic nematodes but was superior to the S,S-dibutyl homologue against parasitic nematodes.

The compounds of the present invention can be used alone as nematocides, but it has been found desirable to apply them to the soil habitat of nematodes, together with inert solids to form dusts or, more preferably, suspended in a suitable liquid diluent, preferably water. They can be applied at widely varying rates, e.g. 0.1–30 lbs./acre.

There can also be added surface active agents or wetting agents and inert solids in such liquid formulations. Desirably, 0.05–1% by weight of surface active or wetting agent is employed. The active ingredient can be from 0.01 to 95% by weight of the entire composition in such case.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, methanol, isopropanol, amyl alcohol, ethylene glycol, propylene glycol, butyl Carbitol acetate and glycerine. Mixtures of water and organic solvents, either as solutions or emulsions, can be employed.

The pesticides of the present invention can also be applied with nematocidal adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

It is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface activeagents include alkyl sulfonate salts, alkylaryl sulfonate salts, alkyl sulfate salts, alkylamide sulfonate salts, alkylaryl polyether alcohols, fatty acids esters of polyhydric alcohols and the alkylene oxide addition products of such esters, and addition products of long chain mercaptans and alkylene oxides. Typical examples of such surface activeagents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethylhexyl)ester of sodium sulfossinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey Red Oil, sodium dibutyl-naphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1000), sorbitan sesquioleate, polyethylene glycol ester of tall oil acids, sodium octyl phenoxyethoxyethyl sulfate, tris (polyoxyethylene) sorbitan monostearate (Tween 60), sodium dihexyl sulfosuccinate.

The solid and liquid formulations can be prepared by any of the conventional procedures. Thus, the active ingredient can be mixed with the solid carrier in finely divided form in amounts small enough to preserve the free-flowing property of the final dust composition.

Unless otherwise indicated all parts and percentages are by weight.

The S,S-dialkyl allylphosphonodithioates of the present invention can be prepared by the following procedure

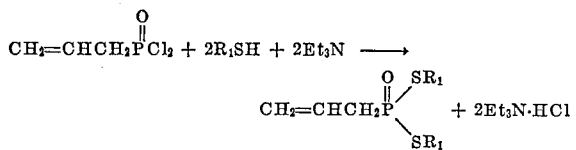

In the formula $R_1$ is a 2 to 4 carbon atom alkyl. As mercaptans there can be used ethyl mercaptan, propyl mercaptan, butyl mercaptan, isopropyl mercaptan, isobutyl mercaptan, sec. butyl mercaptan, or tert. butyl mercaptans. Mixtures of mercaptans can be employed to form mixed esters.

In place of triethylamine there can be employed other acid acceptors, e.g. tertiary amines such as N,N-di-methyl aniline, morpholine, pyridine, tripropylamine, triisobutyl amines, tributylamine, methyldiethylamine, N,N-diethylaniline.

The allylphosphonyl dichloride was synthesized by the procedure described by Kinnear et al., J. Chem. Soc. 3437–45 (1954).

EXAMPLE 1

Aluminum chloride was suspended by continuous stirring in phosphorus trichloride. The suspension was heated to 40–50° C. and allyl bromide added at a slow dropwise rate over a ½ hour period. Excess phosphorus trichloride was recovered by distillation. The resulting aluminum chloride complex was dissolved in about 5–10 volumes of methylene chloride and the solution cooled to —20° C. by the addition of solid carbon dioxide. Water was then added in small portions with vigorous stirring until the milky suspension at first formed suddenly coagulated. The solution was rapidly filtered, the solvent stripped, and the residue distilled to obtain allyl phosphonyl dichloride, B.P.$_{.30}$ 90° C., yield 53%.

EXAMPLE 2

10.1 grams (0.21 mole) of methyl mercaptan was dissolved in 200 ml. of dry benzene and 17.4 grams (0.11 mole) of allyl phosphonyl dichloride added. 21.2 grams (0.21 mole) of triethylamine was then added dropwise with stirring. The reaction mixture was maintained at 20–25° C. with an ice bath. It was then allowed to stand overnight and the following morning washed with cold water. The benzene layer was then dried over anhydrous sodium sulfate and the solvent removed in a vacuum on a steam bath. The S,S-dimethyl allylphosphonodithioate product obtained was purified by distillation, B.P.$_{.0.1}$ 84° C., $n_D^{24}$ 1.5696, yield 40% (Code No. R–7047).

EXAMPLE 3

13.0 grams (0.21 mole) of ethyl mercaptan was dissolved in 200 ml. of dry benzene and 16.5 grams (0.10 mole) of allyl phosphonyl dichloride added. Then 21.0 grams (0.21 mole) of triethylamine was added dropwise with stirring. The reaction mixture was maintained at 20–25° C. With an ice bath. It was allowed to stand overnight and the following morning washed with cold water. The benzene layer was then dried over anhydrous sodium sulfate and the solvent removed in vacuo on a steam bath. The S,S-diethyl allylphosphonodithioate product was purified by distillation, B.P.$_{.0.02}$ 92° C., $n_D^{20}$ 1.5462, yield 75% (Code No. R–6943).

EXAMPLE 4

9.6 grams (0.126 mole) of 1-propanethiol was dissolved in 200 ml. of dry benzene and 10.0 grams (0.63 mole) of allyl phosphonyl dichloride added. Then 12.7 grams (0.126 mole) of triethylamine was added dropwise with stirring. The reaction mixture was maintained at 20–25° C. with an ice bath. It was allowed to stand overnight and the following morning washed with cold water. The benzene layer was dried over anhydrous sodium sulfate and the solvent removed in vacuo on a steam bath. The S,S-dipropyl allylphosphonodithioate product was purified by distillation, B.P.$_{.0.03}$ 112° C., $n_D^{24}$ 1.5278, yield 76% (Code No. R–7290).

EXAMPLE 5

8.0 grams (0.1 mole) of 2-propanethiol was dissolved in 200 ml. of dry benzene and 8.0 grams (0.05 mole) of allylphosphonyl dichloride added. 10.1 grams (0.1 mole) of triethylamine was added dropwise with stirring. The reaction mixture was maintained at 20–25° C. with an ice bath. It was allowed to stand overnight and the following morning washed with cold water. The benzene layer was dried over anhydrous sodium sulfate and the solvent removed in vacuo on a steam bath. The S,S-diisopropyl allylphosphonodithioate product was purified by distillation, B.P.$_{.0.03}$ 92° C., $n_D^{25}$ 1.5265, yield 63% (Code No. R–7611).

EXAMPLE 6

11.3 grams (0.12 mole) of 1-butanethiol was dissolved in 200 ml. of dry benzene and 10.0 grams (0.06 mole) of allyl phosphonyl dichloride added. Then 12.7 grams (0.12 mole) of triethylamine was added dropwise with stirring. The reaction mixture was maintained at 20–25° C. with an ice bath. It was allowed to stand overnight and the following morning washed with cold water. The benzene layer was then dried over anhydrous sodium sulfate and the solvent removed in vacuo on a steam bath. The S,S-dibutyl allylphosphonyldithioate product was purified by distillation, B.P.$_{.0.02}$ 118° C., $n_D^{20}$ 1.5240, yield 72% (Code No. R–7044).

EXAMPLE 7

10.5 grams (0.1 mole) of 1-penanethiol was dissolved in 200 ml. of dry benzene and 8.0 grams (0.05 mole) of allyl phosphonyl dichloride added. 10.1 grams (0.1 mole) of triethylamine was added dropwise with stirring. The reaction mixture was maintained at 20–25° C. with an ice bath. It was allowed to stand overnight and the following morning washed with cold water. The benzene layer was then dried over anhydrous sodium sulfate and the solvent removed in vacuo on a steam bath. The S,S-diamyl allylphosphonyldithioate product was purified by distillation, B.P.$_{0.005}$ 133° C., $n_D^{25}$ 1.5146, yield 75% (Code No. R–7610).

In the following tables illustrating nematocidal activity, the compounds were formulated as wettable powders consisting of 50% of the compound being tested, 46% ultra-fine silica, 2% sodium lignin sulfonate and 2% Pluronic L–61 (polyethylene oxide-polypropylene oxide adduct, molecular weight 1000). This wettable powder is designated hereinafter as Formulation A.

Formulation A was tested against *Panagrellus spp.* and *Rhabditis spp.*, saprophytic nematodes. Formulation A was diluted with water to give the final concentrations set forth in Table 1. The results are recorded as percent kill at the indicated dosages in parts per million of active ingredient after a 4 day incubation period. A 10% kill is merely the same amount of kill as occurs with a blank sample.

TABLE 1

| Example | Compound | NESA at— | | |
|---|---|---|---|---|
| | | 400 p.p.m. | 200 p.p.m. | 25 p.p.m. |
| 2 | R–7047 | 10 | 10 | 10 |
| 3 | R–6943 | 30 | 10 | 10 |
| 4 | R–7290 | 100 | 100 | 80 |
| 5 | R–7611 | 100 | 80 | 10 |
| 6 | R–7044 | 100 | 100 | 100 |
| 7 | R–7610 | 10 | 10 | 10 |

Formulation A was added to soil heavily infested with *Meloidogyne spp.* Then tomato plants (Table 2) or white burley tobacco plants (Table 3) were transplanted into the soil and allowed to grow. The root knots which formed on the roots of the plants were then measured according to a root knot index based on a 0–10 scale where 10 indicates complete absence of visible knotting and 0 indicates all roots were heavily infested (knotted). Tomato (or index of 0 while tomato plants transplanted to soil which did not contain the nematocide had an average root knot index of 0 while tomaco plants transplanted to soil which had been steamed to kill all nematodes had an average root knot index of 10.0.

TABLE 2.—TOMATO SEEDLINGS

| Example | Compound | NEPA at— | | | | |
|---|---|---|---|---|---|---|
| | | 50 p.p.m. | 25 p.p.m. | 12 p.p.m. | 6 p.p.m. | 3 p.p.m. |
| 2 | R–7047 | 0 | 0 | 0 | 0 | 0 |
| 3 | R–6943 | 9 | 0 | 0 | 0 | 0 |
| 4 | R–7290 | 10 | 10 | 10 | 10 | 9 |
| 5 | R–7611 | 9 | 8 | 8 | 8 | |
| 6 | R–7044 | 10 | 10 | 3 | 2 | 0 |
| 7 | R–7610 | 3 | 3 | 0 | 0 | |

TABLE 3.—WHITE BURLEY TOBACCO

| Example | Compound | NEPA at— | | | |
|---|---|---|---|---|---|
| | | 25 p.p.m. | 12 p.p.m. | 6 p.p.m. | 3 p.p.m. |
| 4 | R–7290 | 10 | 10 | 10 | 9 |

What is claimed is:

1. A compound having the formula

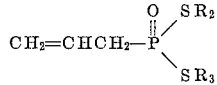

where $R_2$ and $R_3$ are lower alkyl.

2. A compound according to claim 1 wherein $R_2$ and $R_3$ each have 2 to 4 carbon atoms.

3. A compound according to claim 2 which is S,S-diethyl allylphosphonodithioate.

4. A compound according to claim 2 which is S,S-dipropyl allylphosphonodithioate.

5. A compound according to claim 2 which is S,S-diisopropyl allylphosphonodithioate.

6. A compound according to claim 2 wherein $R_2$ and $R_3$ each have 4 carbon atoms.

7. A compound according to claim 6 which is S,S-dibutyl allylphosphonodithioate.

References Cited

UNITED STATES PATENTS 3,193,372   7/1965   Regel _____ 260—956 XR

JOSEPH P. BRUST, Primary Examiner

ANTON H. SUTTO, Assistant Examiner

U.S. Cl. X.R.

260—969, 973; 424—219